(12) United States Patent
Pijlman et al.

(10) Patent No.: US 9,383,083 B2
(45) Date of Patent: Jul. 5, 2016

(54) LIGHTING UNIT, ESPECIALLY FOR ROAD ILLUMINATION

(71) Applicant: KONINKLIJKE PHILIPS N.V., Eindhoven (NL)

(72) Inventors: Fetze Pijlman, Eindhoven (NL); Robert Van Asselt, Valkenswaard (NL); Peter Tjin Sjoe Kong Tsang, Eindhoven (NL); Floris Maria Hermansz Crompvoets, Bunde (NL); Maarten Van Lierop, 's-Hertogenbosch (NL); Hendrik Jan Eggink, Eindhoven (NL)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/647,516

(22) PCT Filed: Nov. 22, 2013

(86) PCT No.: PCT/IB2013/060330
§ 371 (c)(1),
(2) Date: May 27, 2015

(87) PCT Pub. No.: WO2014/083486
PCT Pub. Date: Jun. 5, 2014

(65) Prior Publication Data
US 2015/0330605 A1 Nov. 19, 2015

Related U.S. Application Data

(60) Provisional application No. 61/731,839, filed on Nov. 30, 2012.

(30) Foreign Application Priority Data

Jul. 2, 2013 (EP) .................................... 13174655

(51) Int. Cl.
*F21V 3/00* (2015.01)
*F21V 5/00* (2015.01)
(Continued)

(52) U.S. Cl.
CPC .............. *F21V 13/04* (2013.01); *F21S 8/085* (2013.01); *F21V 5/005* (2013.01); *F21V 15/01* (2013.01); *F21W 2131/103* (2013.01); *F21Y 2101/02* (2013.01); *Y02B 20/72* (2013.01)

(58) Field of Classification Search
CPC ......... F21V 13/04; F21V 15/01; F21V 5/005; F21S 8/085; F21W 2131/103; F21Y 2101/02; Y02B 20/72
USPC ............ 362/249.02, 235, 242, 244, 246, 299, 362/300, 308, 309, 310, 296.05, 296.07, 362/296.08, 311.01, 311.02, 311.06, 0.07, 362/331, 326, 329, 334–336, 349, 311.12
See application file for complete search history.

(56) References Cited

U.S. PATENT DOCUMENTS 3,329,812 A * 7/1967 Harling ................... F21V 13/04
362/223
4,041,303 A * 8/1977 Ricard ................ F21S 48/1233
362/244

(Continued)

FOREIGN PATENT DOCUMENTS

DE 8527914 U1 2/1986
EP 0846914 A1 6/1998

(Continued)

*Primary Examiner* — Anh Mai
*Assistant Examiner* — Glenn Zimmerman

(57) ABSTRACT

The invention provides a lighting unit (100) comprising (a) a lighting unit cavity (130), (b) a light source unit (110), for light source unit light (111), wherein the light source unit (110) comprises a light source (1100) and a collimator (1200), and (c) a light exit window (120), configured to enclose at least part of the lighting unit cavity (130) and configured to allow transmission of at least part of the light source unit light (111) as a beam of light (101), wherein the light exit window (120) comprises an upstream face (125) and a downstream face (126), with the upstream face (125) directed to the lighting unit cavity (130); wherein the upstream face (125) comprises light outcoupling structures (140), configured to couple the light source unit light (111) via the light exit window (120) out of the lighting unit (100).

15 Claims, 9 Drawing Sheets

(51) Int. Cl.
*F21V 13/04* (2006.01)
*F21V 15/01* (2006.01)
*F21S 8/08* (2006.01)
*F21W 131/103* (2006.01)
*F21Y 101/02* (2006.01)

(56) References Cited

U.S. PATENT DOCUMENTS

| | | | | |
|---|---|---|---|---|
| 4,698,734 A | * | 10/1987 | Ngai | F21V 5/02 362/225 |
| 4,803,608 A | * | 2/1989 | Dashwood | F21S 48/24 362/309 |
| 5,335,157 A | * | 8/1994 | Lyons | B60Q 1/2611 362/297 |
| 5,388,035 A | * | 2/1995 | Bodem, Jr. | B60Q 1/2696 362/240 |
| 7,306,356 B1 | | 12/2007 | Ahmadi | |
| 7,578,605 B1 | | 8/2009 | Mullins et al. | |
| 2002/0105801 A1 | | 8/2002 | Martineau | |
| 2007/0012934 A1 | | 1/2007 | Abu-Ageel | |
| 2010/0328926 A1 | * | 12/2010 | Hoelen | C09K 11/7774 362/84 |
| 2013/0121002 A1 | * | 5/2013 | Lin | F21K 9/135 362/296.04 |

FOREIGN PATENT DOCUMENTS

| | | |
|---|---|---|
| EP | 2056018 A1 | 5/2009 |
| GB | 2092734 A | 8/1982 |
| WO | 2007111547 A1 | 10/2007 |
| WO | 2011121488 A1 | 10/2011 |

* cited by examiner

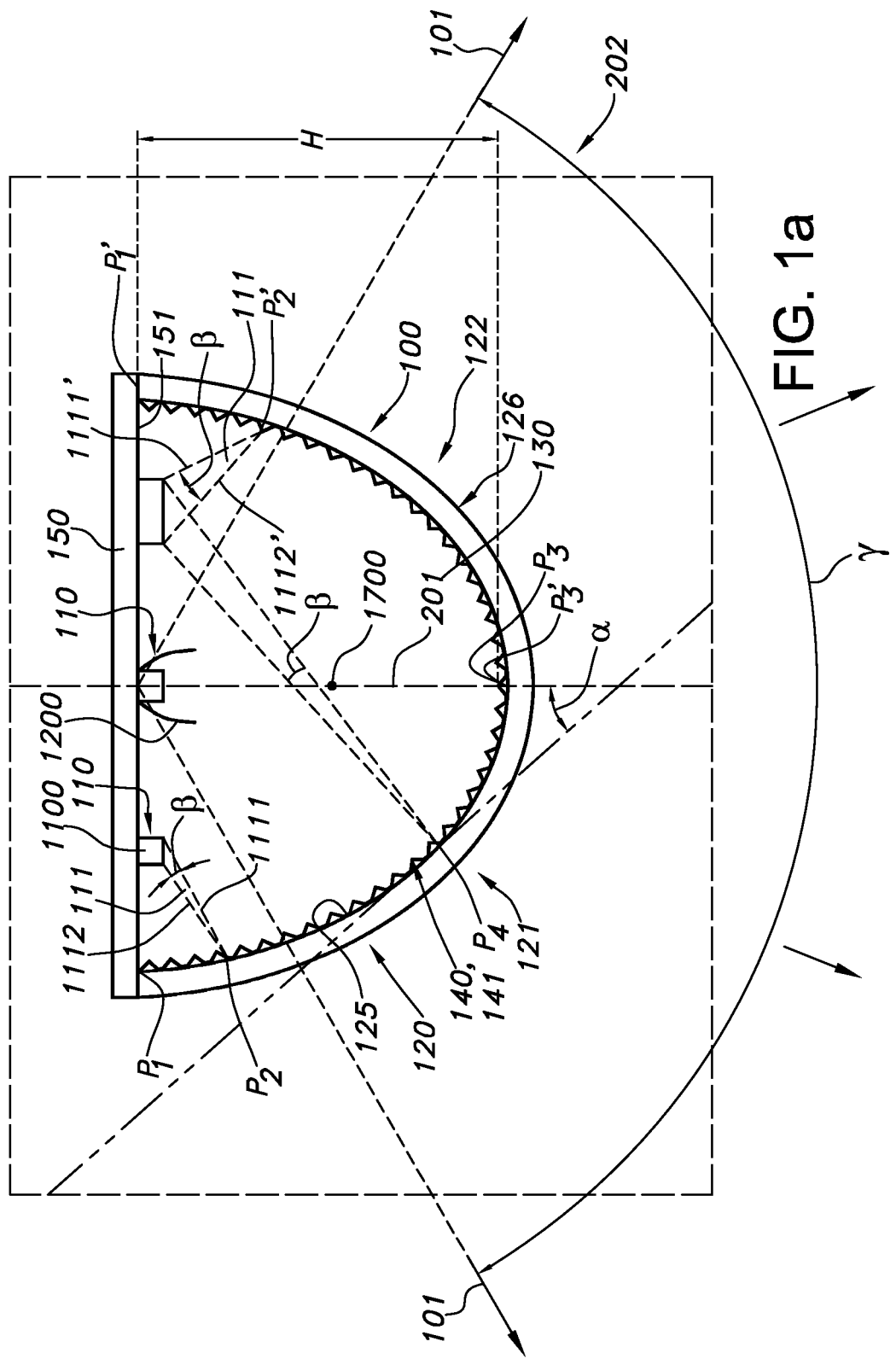

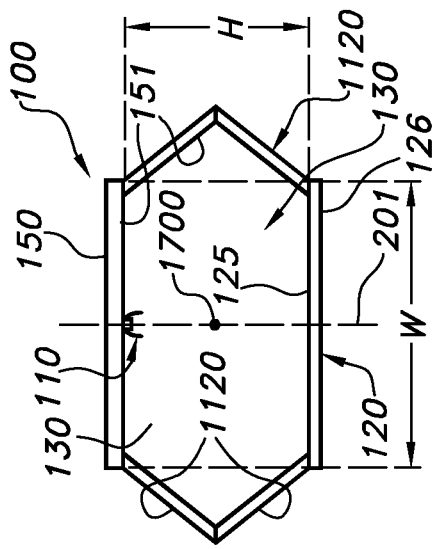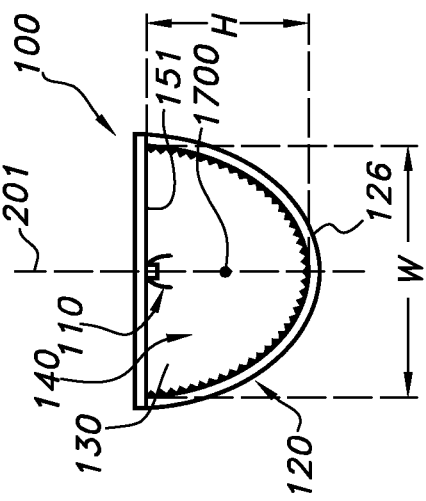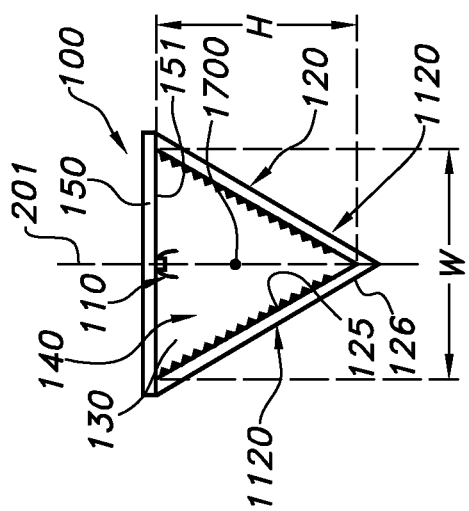

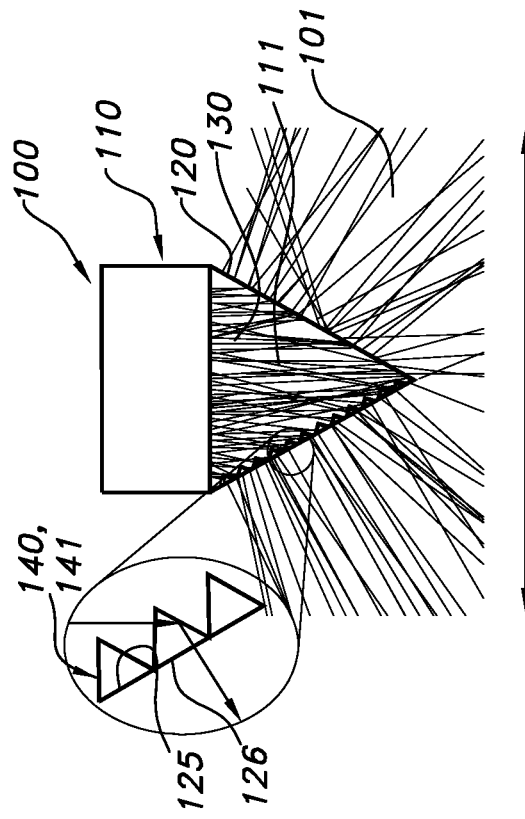
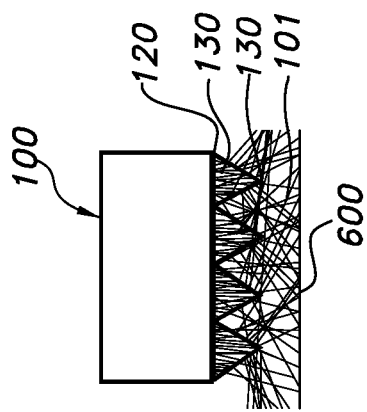
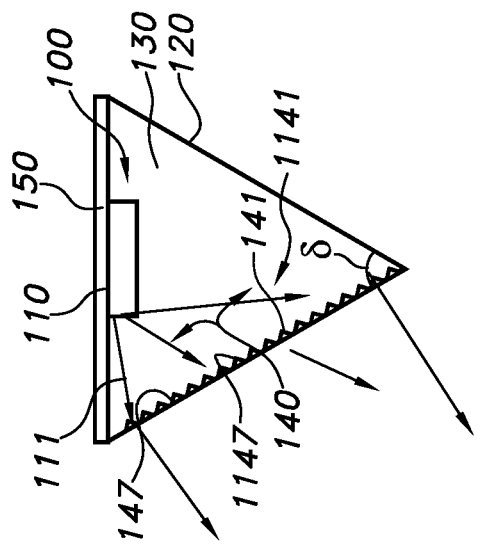
FIG. 2a
FIG. 2b
FIG. 2c

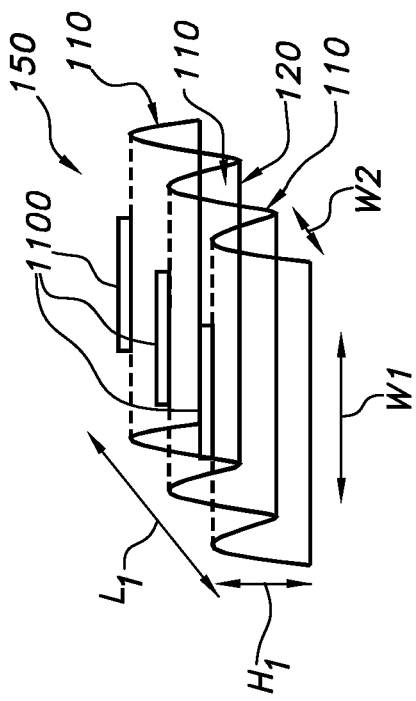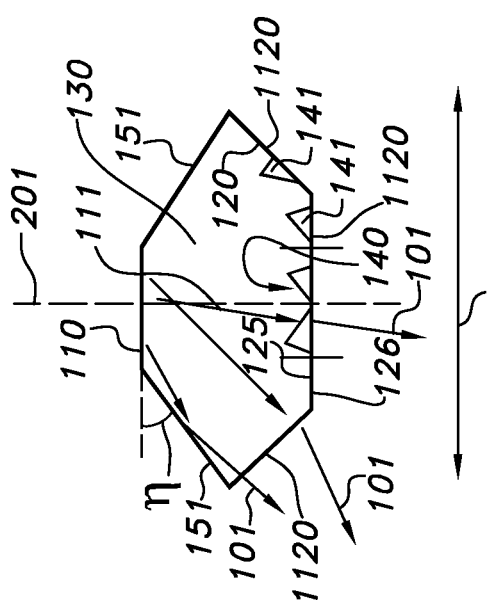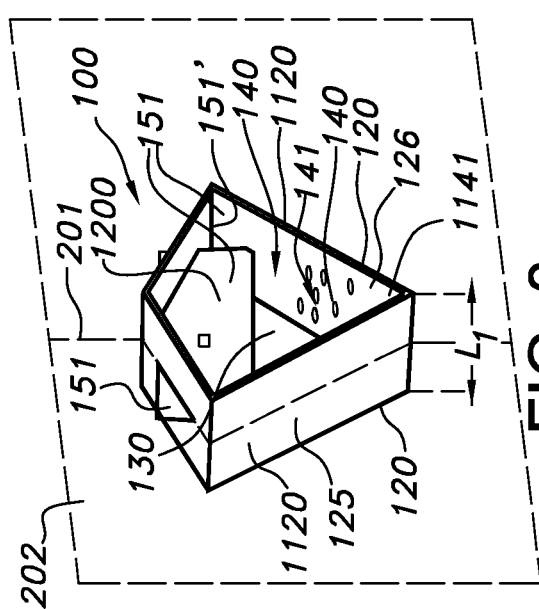

LIGHTING UNIT, ESPECIALLY FOR ROAD ILLUMINATION

CROSS-REFERENCE TO PRIOR APPLICATIONS

This application is the U.S. National Phase application under 35 U.S.C. §371 of International Application No. PCT/IB13/060330, filed on Nov. 22, 2013, which claims benefit of European Patent Application No. 13174655.4 filed on Jul. 02, 2013 and of U.S. Provisional Patent Application No. 61/731,839, filed on Nov. 30, 2012. These applications are hereby incorporated by reference herein.

FIELD OF THE INVENTION

The invention relates to a lighting unit, especially for road illumination.

BACKGROUND OF THE INVENTION

The use of LEDs in street lighting is known in the art. For instance, U.S. Pat. No. 7,578,605 describes a reflector system having two-axis control through which beam collimation and wide-angle beam overlapping occur, and a method of manufacturing such a system through cutting flat reflective sheeting and forming the resultant flat parts into the three-dimensional reflectors that collect and shape the light from solid state LEDs, wherein each axis may be customized by changing the cutting and bending of the flat pieces. Especially, this document describes a streetlight application with an exemplary lighting module assembled within a luminaire, whereby light rays extend longitudinally and rays extend in the transverse direction.

SUMMARY OF THE INVENTION

At present most LED luminaires consist of a LED (light emitting diode) array which is shaped by optical means being lenses, MLO (micro lens optics) plates, or reflector cups. In a substantial amount of applications the brightness needs to be reduced beyond a certain angle. Examples are office lighting and road lighting in which this angle is around 60 or 70 degrees (cut-off angles), respectively.

However, in quite a number of applications one would like to prefer a substantial amount of light under angles for illumination purposes, e.g. uniformity, that are actually also reducing comfort. In office lighting one would like to produce a substantial amount of light at an angle of more than 60 degrees from the ceiling. Such light is known for proper face illumination (for during meetings). In road lighting one encounters a similar situation. Superior luminance uniformity can be obtained by angles more than 70 degrees from the pole. However, this light creates substantial annoyance and should be suppressed to a certain limit. Although in some legislation only intensity is mentioned, brightness does also play an important role for comfort.

Yet another problem that is seen in both mentioned applications is the so-called spottiness of LEDs. In both applications it is popular to use an array of LEDs of which the light is controlled by an MLO plate or a lens array. This often leads to local high brightness peaks on the exit window. Although the average brightness over the exit window may be tolerable, the local peaks may not be.

Hence, there is a desire to overcome the problems of amongst others (i) reduction of brightness at a certain angle while maintaining intensity, (ii) removal of visual spottiness of LEDs, and (iii) making the system less LED dependent. It is further a desire to provide a careful construction of an angular light distribution in a limited volume.

Hence, it is especially an aspect of the invention to provide an alternative lighting unit, which preferably further at least partly obviate one or more of above-described drawbacks and/or problems and/or meets one or more of above-mentioned desires.

Herein, it is amongst others proposed to use a triangular exit window (but other shapes are also possible; see below) which does not only reduce brightness but may also reduce the spottiness of the LEDs.

Hence, in a first aspect, the invention provides a lighting unit comprising: (i) a lighting unit cavity ("cavity"), (ii) a light source unit, configured to generate light source unit light, wherein the light source unit comprises a light source and optionally a collimator, wherein the light source unit is configured to provide light source unit light in the lighting unit cavity, and (iii) a light exit window ("exit window"), configured to enclose at least part of the lighting unit cavity and configured to allow transmission of at least part of the light source unit light as a beam of light, wherein the light exit window comprises an upstream face and a downstream face, with the upstream face directed to the lighting unit cavity; wherein the lighting unit has a virtual first lighting unit axis ("lighting unit axis") in a virtual first lighting unit cross-sectional plane ("cross-sectional plane"), wherein within the cross-sectional plane over especially a length at least 30%, such as at least 50% (like in an embodiment at least 75%) of the light exit window:

the light source unit is especially configured to generate the light source unit light at a point at the light exit window with a spread in an angle of incidence $(\beta) \leq 20°$ of the light source unit light at said point, the upstream face comprises light outcoupling structures, configured to couple the light source unit light via the light exit window out of the lighting unit, wherein the light outcoupling structures may especially comprise prismatic light outcoupling structures, and wherein the lighting unit is configured to generate the beam of light downstream of the light exit window especially having a beam angle $(\gamma)$ in the range of 90-170 within the cross-sectional plane. Especially, at least 75% of the intensity of the light (i.e. visible light intensity in Watts), even more especially at least 85% of the intensity of the light is found within this beam angle. Hence, especially less than 25%, even more especially less than 15% of the total intensity (in Watts) is found beyond these cut-off angle(s). Especially the beam angle $(\gamma)$ is in the range of 90-160°, such as 90-140° or 120-160°. In general, this beam angle (within the cross-sectional plane) is symmetric, i.e. the beam angle $(\gamma)$ may be in the range of 2*45-2*80° (i.e. 90-160°). In an embodiment, the beam angle $(\gamma)$ may be in the range of >140° and equal to or smaller than 170°.

Such lighting unit may advantageously be used for illumination of a road. With the present lighting unit, light may be distributed over a long strip, without substantially suffering from spottiness or undesired brightness. Further, the invention may provide two step optics making the system less LED dependent. Especially, when the light of the LEDs of the lighting unit (assuming a plurality of LEDs) travels (is being "transported") towards the light exit window, the light of the LEDs starts to overlap in space. At the light exit window, it will be redirected (due to the light outcoupling structures; see below). Due to the created overlap by transporting the light and the redirection, one will reduce the spottiness of the LEDs. As the light from the light exit window becomes more uniform, the appearance depends less on the number of LEDs used. For this reason, one can upgrade the LEDs (and optional optics) without changing the appearance of the light from the light exit window.

Hence, the lighting unit may especially be applied for illumination of roads. However, other applications than road illumination, are not excluded, like applications selected from the group consisting of an office lighting system, a household application system, a shop lighting system, a home lighting system, an accent lighting system, a spot lighting system, a theater lighting system, a fiber-optics application system, a projection system, a self-lit display system, a pixelated display system, a segmented display system, a warning sign system, a medical lighting application system, a indicator sign system, a decorative lighting system, a portable system, an automotive application, and a green house lighting system. The term "road" herein may amongst others (also) refer to a way, a motorway, an avenue, an alley, a boulevard, a byway, a drive, an expressway, a highway, lane, a parking lot, a parkway, a passage, a pathway, a pavement, a pike, a roadway, a route, a street, a subway, a terrace, a thoroughfare, a throughway, a thruway, a track, a trail, a turnpike, a viaduct, etc. It especially refers to any entity on which a vehicle may propagate, and which entity has for instance an aspect ratio>1, especially >>100. However, the lighting unit of the invention may also be used for illumination or large areas like a parking, a square, an open place, a stadium, etc.

A further advantage of the lighting unit of the invention is that in principle any light source may be applied, especially any LED light source. Therefore, a further advantage is that the light source may be replaceable.

In a specific embodiment, the light source comprises a solid state LED light source (such as a LED or laser diode). The term "light source" may also relate to a plurality of light sources, such as 2-5000, like 2-200, such as 10-200, like 20-200 or 2-20 (solid state) LED light sources. Hence, the term LED may also refer to a plurality of (solid state) LEDs. The light source is especially configured to generate visible light. This may be white light or may be colored light. Hence, in an embodiment, the light source unit comprises a solid state LED (light emitting diode). The lighting unit may comprise a plurality of light source units, such as 2-5000, like 2-200, such as 10-200, like 20-200 or 2-20. Further, a light source unit may comprise a plurality of light sources. Optionally, the plurality of light sources share a single collimator. The light source unit is further described below. The light source may be a nonpoint light source. A nonpoint light source may be defined as a light source that is sufficiently large in size and close enough to a viewer to appear as an illuminated surface rather than a star-like point of light. For instance, a LED light source may be applied that has a die with a die area larger than 0.5 cm$^2$, such as a die area larger than 1 cm$^2$, such as even equal to or larger than 2 cm$^2$. Especially, when a nonpoint light source (such as with a die area larger than 0.5 cm$^2$) is applied, the light source unit may not necessarily comprise a collimator. Further, in such instance, the lighting unit may especially comprise an array of such light source units which array is perpendicular to the cross-sectional plane (and parallel to a longitudinal axis, see further below).

The lighting unit comprises a lighting unit cavity, a light source unit, and a light exit window. Further elements, like a control, a power source, etc., may also be included, as will be clear to a person skilled in the art.

The lighting unit comprises a lighting unit cavity. This can be seen as light chamber, which it at least partly enveloped by the light exit window. The lighting unit cavity is a hollow item (or hollow body, in general of a plurality of enveloping pieces), which receives the light source unit light. In other words, the light source unit is configured to provide light source unit light in the lighting unit cavity. In an embodiment, the lighting unit cavity contains at least part of the light source unit. Especially, substantially the entire lighting unit cavity is enveloped by (i) the light exit window, (ii) the light source unit(s) or a part comprising the light source unit(s), and (iii) optionally a reflector. Note that the term reflector may also refer to a plurality of reflectors. In other words, the lighting unit cavity is enveloped by an envelope, which may at least comprise the light exit window and a part comprising the light source unit(s) (herein also indicates as support (support (further) comprising one or more light source units), and optionally another part, the latter part especially being reflective. Hence, part of the cavity may be enclosed by a reflector. Note that the support may also be reflective or comprise reflective parts. As the cavity is enveloped, the cavity is a (substantially) closed unit, with at least one part transmissive for light (i.e. the light exit window). Especially, the remainder of the envelope is reflective. The term "reflective" herein especially indicates reflective for visible light.

As indicated above, the light exit window is configured to allow transmission of at least part of the light source unit light as a beam of light, with the light exit window comprising an upstream face and a downstream face, with the upstream face directed to the lighting unit cavity. Hence, the light exit window comprises an inner face, and an outer face. The latter may being perceived by an observer of the lighting unit, when the lighting unit is in operation. The upstream face envelopes thus at least part of the lighting unit cavity.

The upstream face comprises light outcoupling structures which are configured to couple the light source unit light via the light exit window out of the lighting unit. This may especially imply that light from the light source unit travelling through the lighting unit cavity impinges on the light outcoupling structure, penetrates the light outcoupling structure and (the rest of) the light exit window and escapes from the light exit window via the downstream face thereof. Especially, the light outcoupling structures may comprise prismatic light outcoupling structures. In this way, via total internal reflection (TIR), the light may leave the light outcoupling structure(s) and the light exit window, and contribute to the beam downstream of the light exit window. Especially, a substantial part of the upstream face comprises these light outcoupling structures. For instance, at least 30% of the light exit window may comprise such light outcoupling structures. These light outcoupling structures may have dimensions in the range of 0.1 mm-1 cm, such as 0.1 mm-5 mm, like 0.2-2 mm. Here, the term "dimensions" especially relates to length, width or diameter. Especially, the light outcoupling structures have faces, like prisms, such as triangular prisms and/or tetrahedral prisms, which have edges having lengths within the indicated ranges. Hence, in an embodiment, the light outcoupling structures comprise prismatic structures. The light outcoupling structures, such as prismatic structures, may be elongated, especially in a direction perpendicular to the cross-sectional plane (and especially parallel to a longitudinal axis of the lighting unit, see further below). The light outcoupling structures, such as prismatic structures, may have varying pitches and/or varying angles. The pitches may e.g. be in the range of about 0.1-1.5 cm, such as 0.15-1.5 cm, like 0.5-1 cm.

In order to assist defining the optical properties of the lighting unit, a virtual lighting unit axis and virtual lighting unit cross-sectional plane is defined. However, before elucidating these aspects, first some embodiments of the general shape of the lighting unit, especially the light exit window, are described.

In general, the lighting unit (especially its light exit window) may have an oblong shape. In use, such as for illuminating a road, the lighting unit may be configured in such a way, that the lighting unit is configured perpendicular to the direction of the road. The lighting unit may have a body axis or longitudinal axis (virtual). For instance, parallel to this longitudinal axis, a plurality of light source units may be configured.

In an embodiment, the light exit window is V-shaped with two facets arranged under an angle (δ) in the range of 45-90°. In this embodiment, the lighting unit may especially have a trough like shape or an (elongated) triangular prismatic shape. The two (elongated) faces thereof ("facets"), arranged in the indicated angle, may substantially provide the light exit window; the remaining (elongated) face may comprise one or more light source units. Hence, in an embodiment, the light exit window has the shape of an elongated V-shaped trough.

However, the light exit window may also have a curvature (in a direction perpendicular to an longitudinal axis). Hence, in an embodiment the light exit window has a curved shape. For instance, the lighting unit, especially its light exit window, may have the shape of a truncated cylinder. Hence, in an embodiment, the light exit window has the shape of an elongated truncated cylinder like trough.

The light exit window may (thus) also comprise a plurality of facets, like two or more. With a V-shaped light exit window, the light exit window comprises in general two facets (see also above). However, the light exit window may also comprise three or more facets. In an embodiment, the light exit window may for instance comprise three facets, with three facets parallel to a longitudinal axis of the lighting unit. Hence, in an embodiment, the light exit window comprises a plurality of facets, with one facet arranged perpendicular to the first lighting unit axis (which will further be elucidated below).

Hence, in an embodiment the light exit window has a non-flat (non-planar) shape, like curved or facetted. Here, the description of the shape especially relates to the shape in the cross-sectional plane. For instance, the light exit window may (in 3D) comprise a semi-cylindrical shape or trough shape, etc.

In yet another embodiment, the light exit window is (substantially) flat (or planar). Especially the length of the light exit window (i.e. the length in the cross-sectional plane and perpendicular to the lighting unit axis/in operation in general the length parallel to a road) and height of the cavity are chosen to generate in operation a beam of light with above-mentioned beam angle. In such embodiment, the envelope comprises the (substantially) flat light exit window. Further, such envelope will in general comprise a reflector with the light exit window arranged at one side (downstream side) of the reflector. At an upstream side of the reflector, the light source unit (or plurality of light source units) is arranged. Especially, in such embodiment, a shortest distance between the light source unit and the reflector is small, such as in the range of <10 cm, especially <5 cm, such as <2.5 cm. In general, the onset of the reflector will be in physical contact with a support for the light source units. The support may thus be relatively narrow. As indicated above, the support may also have reflective properties. In case a plurality of light source units is applied, the largest mutual distance in the virtual cross sectional plane between light source units is also relative short, such as <10 cm, especially <5 cm, such as <2.5 cm.

A light source unit generates (in operation) light that has a beam axis. Often, the beam axis indicates the direction of the propagation of the light. Assuming a single light source unit, the beam axis thereof will in general be configured perpendicular to the longitudinal axis. Assuming a plurality of light source units, the beam axes of the plurality of light sources will also in general be configured perpendicular to the longitudinal axis. Especially, in average, the beam axes of the plurality of light sources will also in general be configured perpendicular to the longitudinal axis.

Herein, a first lighting unit axis is defined. This is a virtual axis for the sake of defining some aspects of the lighting unit. Especially, this first lighting unit axis may coincide with a beam axis of a light source unit. Hence, in general this first lighting unit axis will be perpendicular to the longitudinal axis, assuming an oblong lighting unit. When a plurality of light source units is applied, that are arranged in an array (1 or multi dimensional) parallel to the longitudinal axis, also a plurality of first lighting unit axes may be defined, which are especially in one plane. This plane may especially also comprise the longitudinal axis of the lighting unit.

Herein, further a first lighting unit cross-sectional plane ("cross-sectional plane") is defined. This first lighting unit cross-section plane is a virtual plane. The first lighting unit cross-section plane contains the first lighting unit axis. Assuming again an oblong lighting unit, the first lighting unit cross-section plane will be perpendicular to the longitudinal axis. Assuming the lighting unit in operation, with the lighting unit being arranged over a road, the first lighting unit axis may be perpendicular to the road, and the first lighting unit cross-section plane may also be perpendicular to the road; however, also in parallel to a longitudinal axis of the road. Assuming that a plurality of light source units is applied, that are arranged in an array parallel to the longitudinal axis, each (first) lighting unit may be comprised by a respective first lighting unit cross-section plane; the thus provided (first) lighting unit cross-section planes may be configured parallel to each other, and may form an array of parallel arranged (first) lighting unit cross-section planes (which may be perpendicular to the longitudinal axis). The first lighting unit cross-section plane is especially configured perpendicular to the light exit window.

Below, some aspects of the invention are explained with reference to a virtual first lighting unit axis and a virtual first lighting unit cross-section plane. However, when a plurality of these are present, such as especially when a longitudinally arranged array of light source units is applied, the below defined aspects may relate to each part of the light exit window where a first cross-sectional plane intercepts with the light exit window. In other words, the specific definitions with respect to the spread in the angle of incidence (see below) and the light outcoupling structures (see also below), may apply to 30% or more of the area of the upstream face of the light exit window.

As indicated above, the first lighting unit cross-section plane is especially perpendicular to the light exit window. Hence, there is a line along the light exit window where the first lighting unit cross-section plane intercepts the upstream face of the light exit window. This line will be a straight line (or two straight lines) in case of a V-shaped light exit window, and will be a curved line in case of a curved light exit window, etc. This line has a length, and over at least 30% of this length, such as at least 50% of this length, the following condition may apply: the light source unit is configured to generate the light source unit light at a point (P) at the light exit window with a spread in an angle of incidence (β)≤20° of the light source unit light at said point (P). As the light source unit may not be a pure point light source, at a same position light of the light source unit may impinge on the light exit surface under different angles, based on the position from which a light ray escapes from the light source unit. Hence, the light source unit, as well as the dimensions of the light unit cavity, are selected in such a way, i.e. for example LED die dimensions, optionally collimator dimensions, and of course lighting unit cavity dimensions, that the spread in an angle of incidence is not larger than ≤20°. For instance, the spread in the angle of incidence may be in the range of 1-20°. Especially, the light source unit is configured to generate the light source unit light at a point (P) at the light exit window with a spread in an angle of incidence ($\beta$)≤10° of the light source unit light at said point (P).

When a plurality of light source units is applied, this may apply to each light source unit. Note that each light source unit may have its corresponding cross-sectional plane.

Thus, these general and specific conditions apply over at least 30% of the length of this line along the light exit window, even more especially at least over at least 50% of the length of this line along the light exit window. In an embodiment, these general and specific conditions apply over at least 75% of the length of this line along the light exit window. Thus, any point P within this range of 30% (or more) of the length will receive light from the light source unit(s) with a spread in an angle of incidence is not larger than ≤20°. This spread in the angle of incidence at point(s) P is especially evaluated for each light source unit that may provide light at point(s) P. Especially when there are a plurality of light source units, the spread of the angle of incidence may be determined for each light source unit separately.

Over at least 30% of this length, such as at least 50% of this length, the following condition may also apply: the upstream face comprises light outcoupling structures, configured to couple the light source unit light via the light exit window out of the lighting unit, wherein the light outcoupling structures may especially comprise prismatic light outcoupling structures. The light outcoupling structure have been described above. In a specific embodiment, at least 50% of the upstream face comprises prismatic light outcoupling structures.

Thus, these general and specific conditions apply over at least 30% of the length of this line along the light exit window, even more especially at least over at least 50% of the length of this line along the light exit window. Thus, substantially any point P within this range of 30% (or more) will be part of a prismatic structure (or of an array of prismatic structures).

In this way, the lighting unit may be configured to generate the beam of light downstream of the light exit window having a beam angle ($\gamma$) in the range of 90-170°, such as 90-140° or 120-160°, within the cross-sectional plane. Within this angular range, at least 75% of the intensity (Watts) of the visible light of the lighting unit light may be found. Hence, in an embodiment, the lighting unit is especially configured to generate a beam of light downstream of the light exit window, wherein the beam of light has a cone angle that is especially equal to or smaller than 170°, such as e.g. equal to or smaller than 140°. Especially, this cone may be an elongated cone, with a largest cone angle in the range of 90-170°, such as 90-140° (and with a smallest cone angle being smaller than the largest cone angle). The beam may have a cross-sectional area having an aspect ratio of e.g. >2, such as >4, in an embodiment >10, or even >100. In this way, a beam may be provided that may efficiently illuminate a road. In a specific embodiment, beam may have a cross-sectional area having an aspect ratio of e.g. >4.

Returning to the geometrical aspects of the lighting unit: in a specific embodiment, within the cross-sectional plane over a length at least 30% of the light exit window, especially at least 50% of this length, the following may also especially apply: the light exit window is arranged under a slanting angle ($\alpha$) in the range of 30-60° with the lighting unit axis. Hence, over a length of at least 30%, any point will have such slanting angle. For instance, the slanting angle of a V-shaped light exit window may for both facets be in the range of especially 30-60° (see also above). Smaller or larger angles, for a substantial part of the length may lead to worse outcoupling efficiencies. Note however, that in case of e.g. truncated cylinder, part of the upstream face may have larger angles, and part may have smaller angles with respect to the fist lighting unit axis. Especially, where the first lighting unit axis intercepts the light exit window, this angle may be 90°, whereas at positions closer to a part comprising the light source unit, this angle may in some embodiments be close to 0° (or 180°) (i.e. substantially parallel to the first lighting unit axis).

In addition to the light outcoupling structures that may be prismatic type of structures, there may also be structures that are configured to direct the light out of the lighting unit cavity via refraction. Hence, in an embodiment the upstream face further comprises a region with refractive light outcoupling structures. In general, the region with refractive light outcoupling structures is at larger angles with the first lighting unit axis, whereas a region with prismatic light outcoupling structures is at smaller angles with the first lighting unit axis than the region with refractive light outcoupling structures. Also for these light outcoupling structures, such as prismatic structures, applies that they may have varying pitches and/or varying angles. The pitches may e.g. be in the range of about 0.1-1.5 cm, such as 0.15-1.5 cm, like 0.5-1 cm.

For good efficiencies and good light distributions it may be beneficial to define specific ratio's for the dimensions of the lighting unit cavity. Especially, the cavity has a cavity height and a largest cavity width, wherein the ratio cavity height to cavity width is larger than 0.4. Even more especially, the ratio cavity height to cavity width is in the range of 0.4-2, such as at least 0.7. This may especially apply in embodiments wherein the light exit window is non-flat (non-planar), such as curved or V-shaped, or facetted.

As indicated above, the light source unit may comprise a collimator. A collimator is especially a device that narrows a beam of light. Different types of collimators may herein be applied, include a type that is also know as a compound parabolic concentrator (CPC; which can also be used to collimate of light of a light source within the CPC). Especially, the collimator is configured to collimate the light source(s) light in a dimension perpendicular to the cross-sectional plane. Assuming the lighting unit in operation over a road, this may especially lead to a (more) narrow beam of lighting (narrow compared to the width of the road). In this way, this is helpful in obtaining a beam of light with a large aspect ratio (i.e. in the length of the road). Nevertheless, the collimator may also be configured to collimate in a dimension parallel to the cross-sectional plane. This may assist in reducing the spread in the angel of incidence on the upstream face of the light exit window. Would this spread be too large, this would lead to light that is difficult to redirect without artefacts at angles beyond the cut-off (angle). Cutting this part of the light off from the beginning is a good starting point. Hence, in an embodiment, the light source unit may optionally comprise a collimator, which collimator may especially be configured to collimate the light source light in one or two dimensions. The collimator may collimate the light in a dimension parallel to the cross-sectional plane and/or in a dimension perpendicular to the cross-sectional plane. Therefore, in an embodiment the collimator is especially configured to collimate the light source light in a direction perpendicular to the cross-sectional plane. In an embodiment, the collimator may be a reflector, like a V-shaped reflector (with a longitudinal axis parallel to the first lighting unit cross-sectional plane). However, the collimator may also be a compound parabolic collector (see also above). In a specific embodiment, each light source unit comprises a light source and a collimator configured to collimate the light from the respective light source. In yet a further embodiment, when a plurality of light source units is applied, with a plurality of light source units (each) including a collimator, a 2D array of light source units may be applied (i.e. an array of collimators may be applied, with the collimators hosting one or more light sources).

For further collimating, especially in a plane (or direction) perpendicular to the first lighting unit cross-sectional plane, also at the downstream face of the light exit window optical features may be provided. Hence, in an embodiment, the light exit window may further comprise a plurality of redirecting structures (light redirecting structures) at the downstream face. These redirecting structures at the downstream face may especially be configured to control the spread of the light source light in a direction perpendicular to the cross-sectional plane. Hence, these redirecting structures at the downstream face may especially be configured to control the distribution of the light source light in a direction perpendicular to the cross-sectional plane. Again, these type of redirecting structures may be prismatic type of structures. These structures may make sure that light is properly spread in the dimension perpendicular to the dimension first lighting unit cross-sectional plane (in operation over a road, e.g. in the dimension perpendicular to the direction of propagation on the road). Note that the control of this distribution may not only be controlled by providing redirecting structures at the downstream face, but may additionally or alternatively also be controlled by tilting at least part of the prismatic structures at the upstream face of the light exit window. For these redirecting structures, such as prismatic structures, applies that they may have varying pitches and/or varying angles. The pitches may e.g. be in the range of about 0.1-1.5 cm, such as 0.15-1.5 cm, like 0.5-1 cm. The light redirecting structures at the downstream face, such as prismatic structures, may be elongated, especially in a direction parallel to the cross-sectional plane (and especially perpendicular to a longitudinal axis of the lighting unit, see further below). Hence, when following the line along the light exit window where the first lighting unit cross-section plane intercepts the upstream face of the light exit window, at the upstream face light outcoupling structures may be found, and at the downstream face of the light exit window light redirecting structures may be found. Both structures may be elongated structures, and may be arranged in arrays with perpendicular pitches. The upstream structures having elongation axes parallel to the longitudinal axis and the downstream structures having elongation axes perpendicular thereto.

In an embodiment, part of the light exit window comprises at the upstream face light outcoupling structures with one or more facets being arranged substantially parallel to the lighting unit axis, for instance having an angle therewith in the range of 0-5°. This part may especially be centered around the lighting unit axis. Especially, this part may thus be found in an area within a beam angle ($\gamma$) of 0-45°. One or more other parts may however include (only) facets having higher angles with the lighting unit axis, such as light outcoupling structures with one or more facets being arranged under an angle to the lighting unit axis in the range of 5-90°, especially 10-80°. These one or more other parts may especially be more remote from the lighting unit axis. Especially, these one or more parts may thus be found in an area within a beam angle ($\gamma$) of 30-90°. The pitches of the structures (in general) are especially in the range of 0.01-20 mm. Especially, in an embodiment in the range of 20-60% of the upstream face of the light exit surface comprises the former structures and in the range of 30-70% of the upstream face of the light exit surface comprises the later structures. As indicated above, not the entire upstream face may comprise light outcoupling structures. Especially at least 50% of the upstream face comprises light outcoupling structures, even more especially at least 75%. Here, the percentages refer to the upstream area of the light exit surface. Hence, the steepness of the facets of the prismatic structures may vary over the (upstream face) of the light exit window.

As already indicated above, the lighting unit may comprise an array of light source units and an elongated light exit window, configured to enclose at least part of the lighting unit cavity and configured to allow transmission of at least part of the light source unit light as the beam of light. Such lighting unit may thus especially be an elongated lighting unit, as indicated above, with an array of light source units, arranged in an array parallel to a longitudinal axis of the lighting unit. Note that such array may also be an nxm array, with n and m being in the range of 1-500, especially n being in the range of 1-10, such as 2-10, and m being in the range of 10-500, such as 20-200. Here, n may indicate the number of light source units parallel to the first lighting unit cross-sectional plane, and m may indicate the number of the light source units in an array perpendicular to this plane (such as parallel to a longitudinal axis).

Hence, the invention provides a lighting unit comprising: (i) a lighting unit cavity ("cavity"), (ii) a light source unit, configured to generate light source unit light, wherein the light source unit comprises a light source and optionally a collimator, wherein the light source unit is configured to provide light source unit light in the lighting unit cavity, and (iii) a light exit window ("exit window"), configured to enclose at least part of the lighting unit cavity and configured to allow transmission of at least part of the light source unit light as a beam of light, wherein the light exit window comprises an upstream face and a downstream face, with the upstream face directed to the lighting unit cavity, wherein the upstream face comprises light outcoupling structures, configured to couple the light source unit light via the light exit window out of the lighting unit, wherein the light outcoupling structures may especially comprise prismatic light outcoupling structures, and wherein the lighting unit is configured to generate the beam of light downstream of the light exit window especially having a beam angle ($\gamma$) in the range of 90-170°, wherein the light exit window especially comprises a non-flat shape, such as curved shape or a facetted shape or a V-shape. Especially, at least 75% of the intensity of the light (i.e. visible light intensity in Watts), even more especially at least 85% of the intensity of the light is found within this beam angle. Hence, especially less than 25%, even more especially less than 15% of the total intensity (in Watts) is found beyond these cut-off angle(s). Especially the beam angle ($\gamma$) is in the range of 90-160°, such as 90-140° or 120-160°. The non-flat light exit window may also be a facetted window. Facetted especially refers to facets arrange with mutual non-zero (and non 180° or no 360°) angles.

The terms "upstream" and "downstream" relate to an arrangement of items or features relative to the propagation of the light from a light generating means (here the especially a light source), wherein relative to a first position within a beam of light from the light generating means, a second position in the beam of light closer to the light generating means is "upstream", and a third position within the beam of light further away from the light generating means is "downstream".

The term "substantially" herein, such as in "substantially all emission" or in "substantially consists", will be understood by the person skilled in the art. The term "substantially" may also include embodiments with "entirely", "completely", "all", etc. Hence, in embodiments the adjective substantially may also be removed. Where applicable, the term "substantially" may also relate to 90% or higher, such as 95% or higher, especially 99% or higher, even more especially 99.5% or higher, including 100%. The term "comprise" includes also embodiments wherein the term "comprises" means "consists of".

Furthermore, the terms first, second, third and the like in the description and in the claims, are used for distinguishing between similar elements and not necessarily for describing a sequential or chronological order. It is to be understood that the terms so used are interchangeable under appropriate circumstances and that the embodiments of the invention described herein are capable of operation in other sequences than described or illustrated herein.

The devices or apparatus herein are amongst others described during operation. As will be clear to the person skilled in the art, the invention is not limited to methods of operation or devices in operation.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "to comprise" and its conjugations does not exclude the presence of elements or steps other than those stated in a claim. The article "a" or "an" preceding an element does not exclude the presence of a plurality of such elements. The invention may be implemented by means of hardware comprising several distinct elements, and by means of a suitably programmed computer. In the device claim enumerating several means, several of these means may be embodied by one and the same item of hardware. The mere fact that certain measures are recited in mutually different dependent claims does not indicate that a combination of these measures cannot be used to advantage.

The invention further applies to an apparatus or device comprising one or more of the characterizing features described in the description and/or shown in the attached drawings. The invention further pertains to a method or process comprising one or more of the characterizing features described in the description and/or shown in the attached drawings.

The various aspects discussed in this patent can be combined in order to provide additional advantages. Furthermore, some of the features can form the basis for one or more divisional applications.

BRIEF DESCRIPTION OF THE DRAWINGS

Embodiments of the invention will now be described, by way of example only, with reference to the accompanying schematic drawings in which corresponding reference symbols indicate corresponding parts, and in which:

FIGS. 1a-1i schematically depict some aspects of the invention;

FIGS. 2a-2c schematically depict some further aspects of the invention, including some ray tracing figures; and FIGS. 3a-3h schematically depict some variants and some applications.

Figure 1B:
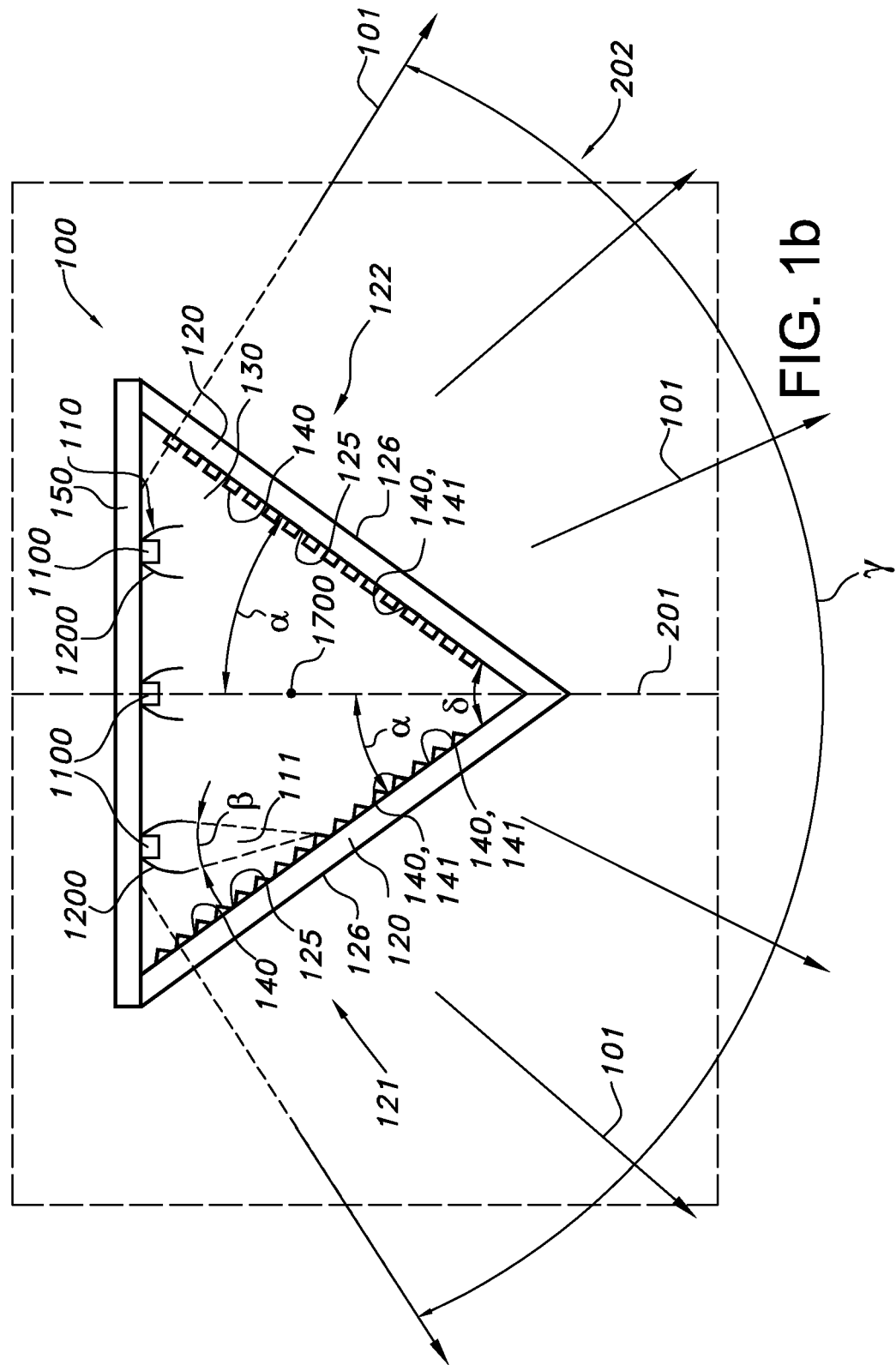

The drawings are not necessarily on scale.

DETAILED DESCRIPTION OF THE EMBODIMENTS

FIG. 1a schematically depicts an embodiment of the lighting unit 100 as described herein. The lighting unit comprises a lighting unit cavity 130, a light source unit 110 and a light exit window 120. The lighting unit 100 is especially configured to generate the beam of light 101 downstream of the light exit window 120 (i.e. external from the lighting unit cavity 130, at the downstream face (see below)) having a beam angle γ in the range of 90-170°, such as 90-140° or 120-160°, within a cross-sectional plane 202 (see also below).

The light source unit 110 is configured to generate light source unit light 111. The light source unit 110 comprises a light source 1100 and optionally a collimator 1200 (here schematically depicted to be present). The light source unit 110 is configured to provide light source unit light 111 (especially visible light) in the lighting unit cavity 130. Note that only by way of example, the light source units 110 are different, with the left light source unit 110 comprising a small(er) light source, the middle light source unit comprising a light source 1110 and a collimator 1200, and the right light source unit comprising a relative large light source, such as a large size die LED. In general, all light source units will be similar. FIG. 1a schematically depicts a cross sectional view, with an array of light source units. Along a longitudinal axis 1700 (see also below), a further dimension of an array of light source units 110 can be present. For instance, this schematic drawing may be representative for a lighting unit having a 3×m light source unit array, with m being e.g. in the range of 1-500, such as 10-500.

In general (this may apply to all embodiments), when there is parallel to the cross-sectional plane 202 a plurality of light source units, each light source unit comprises a collimator. This may guarantee that the light of the different light sources illuminate specific subsets of the light extracting structures; i.e. this may reduce that single prismatic structure receive light from all kind of directions (undefined). Likewise, when nonpoint like light sources applied these may especially be arranged in a one dimensional array (parallel to a longitudinal axis) (see also FIG. 3c).

Further, the light exit window 120 is configured to enclose at least part of the lighting unit cavity 130 and configured to allow transmission of at least part of the light source unit light 111 as a beam of light 101. The light exit window 120 comprises an upstream face 125 and a downstream face 126, with the upstream face 125 directed to the lighting unit cavity 130.

In general, the light exit window may comprise or consist of may comprises one or more materials selected from the group consisting of a transmissive organic material support, such as selected from the group consisting of PE (polyethylene), PP (polypropylene), PEN (polyethylene napthalate), PC (polycarbonate), polymethylacrylate (PMA), polymethylmethacrylate (PMMA) (Plexiglas or Perspex), cellulose acetate butyrate (CAB), silicone, polyvinylchloride (PVC), polyethyleneterephthalate (PET), (PETG) (glycol modified polyethyleneterephthalate), PDMS (polydimethylsiloxane), and COC (cyclo olefin copolymer).

The lighting unit 100 has a virtual first lighting unit axis 201 in a virtual first lighting unit cross-sectional plane 202. In this schematic drawing, the former is parallel to a beam axis of light from a light source unit 110; the latter is parallel to the plane of drawing, and perpendicular to the light exit window

120. The lighting unit may be an elongated or oblong lighting unit, with a longitudinal axis 1700. This longitudinal axis 1700 may (thus) be perpendicular to the virtual first lighting unit axis 201 in a virtual first lighting unit cross-sectional plane 202. This longitudinal axis 1700 may (thus) also be perpendicular to the virtual first lighting unit cross-sectional plane 202. The cross-sectional plane 202 may be perpendicular to the light exit window 130 (as depicted in FIG. 1*a*).

Reference 150 indicates a support, that may be used as support for the light source unit(s) 110. As indicated above, by way of example the middle light source unit 110 comprises a collimator 1200, and the others do not comprise such collimator. However, the invention also includes embodiments wherein none or all light source units 110 comprise collimators 1200. The support may comprise a reflective surface 151. In this way, the lighting unit cavity is essentially enveloped by (transmissive) the light exit window 120 and reflective surface(s) 151.

In FIG. 1*a*, a curved light exit window is schematically depicted. Hence, angle a, the angle between a tangent with the light exit window 120 and the first lighting unit axis, varies of the length of the light exit window. In this embodiment, the variation is from about 0° at P1 to 90° at P3/P3' to 0° at P1'. The light exit window 120 may comprise a first part 121 and a second part 122 (here left and right).

Within the cross-sectional plane 202 over a length at least 30% of the light exit window 120 the light source unit 110 is configured to generate the light source unit light 111 at a point P at the light exit window 120 with a spread in an angle of incidence β≤20° of the light source unit light 111 at said point P. The length along the light exit window 120 is the length from P1-P3, and from P3'-P1' (with P3 and P3' coinciding). Along 30% of the length of P1-P3 and along 30% of the length P3'-P1' the aforementioned condition applies. The light exit window 120 can be divided in two parts, a first part 121 and a second part 122; wherein in this embodiment the first part is the part on one side of a plane perpendicular to the cross-sectional plane 202, but also comprising the first lighting unit axis 201, and wherein the second part 122 is on the other side of such plane perpendicular to the cross-sectional plane 202, but also comprising the first lighting unit axis 201 (i.e. a plane perpendicular to the plane of drawing).

The angle β can be seen as the angle between two rays 1112 and 1111, which both originate from the same light source unit, but which have a mutual largest angle, the spread in the angle of incidence. Hence, it is the largest mutual angle between rays of a single light source unit. The larger the light source/light source unit, the larger this angle β may be. Likewise, the larger the lighting unit cavity 130, the smaller this angle β will be. Examples of such spreads in the angle of incidence are for different points P indicated, which are for the sake of reference indicated with reference P2, P4, and P2' (with rays 1111' and 1112'). The smaller the angle, the more defined the light impinges on the light outcoupling structures 140.

Within the cross-sectional plane 202 over a length at least 30% of the light exit window 120 also the upstream face 125 comprises light outcoupling structures 140, configured to couple the light source unit light 111 via the light exit window 120 out of the lighting unit 100. Especially, the light outcoupling structures 140 may comprise prismatic light outcoupling structures 141. Along 30% of the length of P1-P3 and along 30% of the length P3'-P1' the aforementioned condition applies.

FIG. 1*b* is another embodiment, here with a V-shaped light exit window 120 is schematically depicted. Here, two facets are two parts 121, 122 form the light exit window 120.

FIGS. 1*c*-1*e* schematically depict some variants, with FIG. 1*c* again the V-shaped light exit window 120 (1*c*), thus having two facets, indicated with reference 1120, a curved light exit window 120 (1*d*), and a light exit window 120 with more than two facets 1120. In the embodiment schematically depicted in FIG. 1*e*, the upper two facets 1120, closer to the support 150, may not be part of the light exit window, but may be reflective. The other three facets 1120, the two lower and the horizontal facet, may be comprised by the light exit window. The light exit window 120 may comprise more than three facets 1120. The more facets, the more the light exit window may show similarity to the curved light exit window 120 of FIG. 1*d*.

Figure 1G:
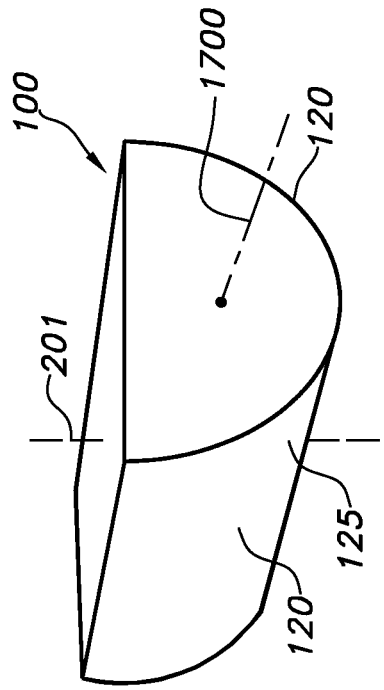
Figure 1F:
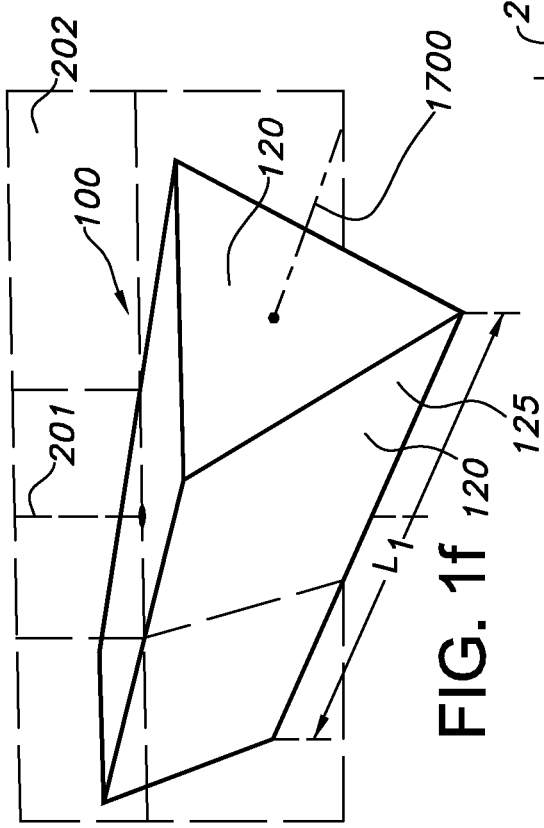

FIGS. 1*f* and 1*g* schematically depict 3D versions of the lighting units 100 as schematically depicted in cross section in FIGS. 1*b*/1*c* and 1*a*/1*d*, respectively. In general, (cavity length) L1>H (cavity height) and (cavity length) L1>W (cavity width); further, in general W>H. Note that the conditions that are defined relative to the first lighting unit axis 201 and the first cross-sectional plane 202 may apply to a plurality of parallel arranged cross-sectional plane 202 (that do not necessarily comprise a first lighting unit axis 201); this may depend upon the number of light source units.

Figure 1H:
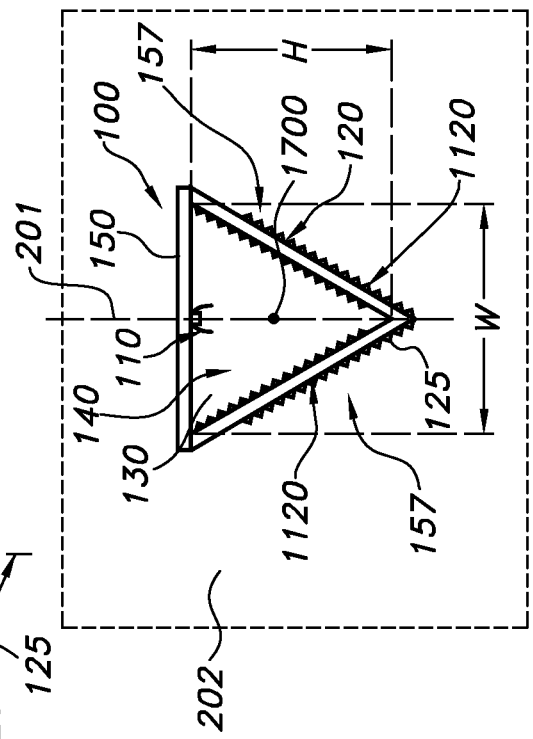

FIG. 1*h* schematically depicts an embodiment wherein the downstream face 126 comprises (also) redirecting structures 157. These may be used to control the distribution of the light in a direction perpendicular to the cross-sectional plane 202 (thus in a direction parallel to the length L1 of the lighting unit 100; see also FIGS. 1*f*, 3*e* and 3*f*).

Figure 1I:
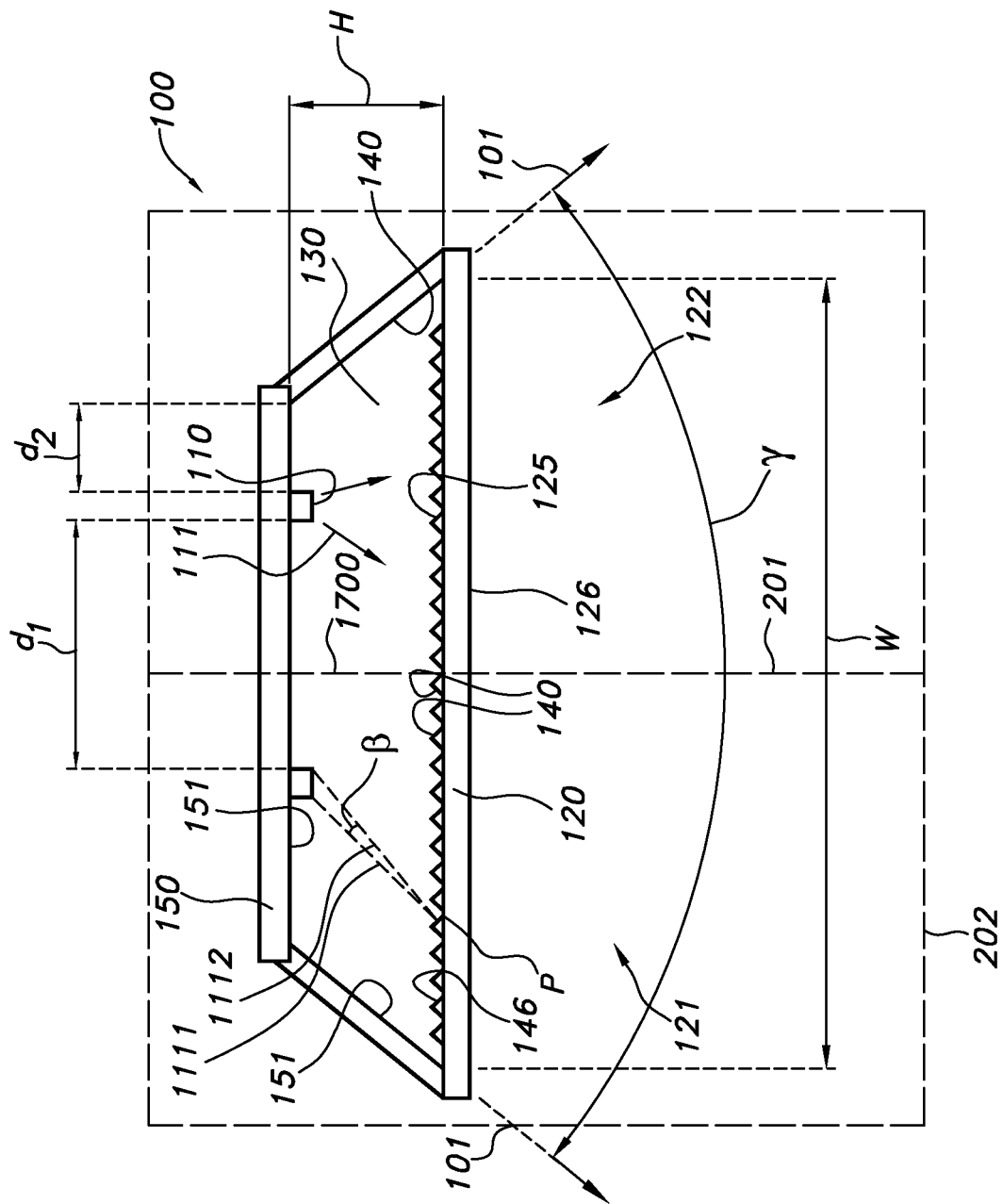

FIG. 1*i* schematically shows an embodiment with a substantially flat light exit window 120. In such embodiment, the envelope comprises the (substantially) flat light exit window. The envelope, i.e. the part enclosing the cavity 130, comprises reflector 151 which at one side (downstream side) of the reflector comprises the light exit window 120. At an upstream side of the reflector, the light source unit 110, here a plurality of light source units 110 is arranged, at support 150. Especially, in such embodiment, a shortest distance between the light source unit and the reflector is small, such as in the range of <10 cm, especially <5 cm, such as <2.5 cm. This distance is indicated with reference d2. Here, a plurality of light source units 110 is applied. The largest mutual distance in the virtual cross sectional plane between light source units 110 may be in the range of <10 cm, especially <5 cm, such as <2.5 cm. Especially, the onset of the reflector 151 is at the light source unit(s) 110, i.e. d2≈0 cm. In this way, the reflector 151 may have a shielding effect. The reflector 151 may predominately influence the beam angle γ.

Embodiments such as schematically depicted in FIG. 1*i*, i.e. embodiments of the lighting unit with a (substantially) flat light exit window, may have a width W, height H and length L1 (L1 is the length of the unit perpendicular to the plane of drawing (see also FIGS. 1*f*, 3*a*, and 3*d*) with are about the same for indoor applications, such as office applications, i.e. W≈H≈L1. For outdoor applications, especially road lighting H≈L1 and W≥H, especially W≥2*H, even more especially, W≥4*H.

FIGS. 2*a*-2*c* schematically depict some other variants and/or aspects of the invention. Note that in FIG. 2*a*, the upstream face 125 of the light exit window comprises a region wherein the light outcoupling structure are configured to use the principle of total internal reflection; this region is indicated as TIR region 1141, and comprises e.g. prismatic light outcoupling structures 141. A region closer to the support 150 comprises a region wherein the light outcoupling structure are configured to use the principle of refraction; this region is indicates as refractive region 1147, and comprises refractive outcoupling structures 147. FIGS. 2*b* and 2*c* schematically depict ray tracing of a V-shaped embodiment (2b) and of an embodiment with a plurality of V-shaped light exit windows 120. Reference 600 indicates road. A good spread over a substantial length of the road is possible with the lighting unit 100 of the invention. Here, the support with light source unit(s) is very schematically depicted as bar.

Referring to FIG. 2c, in an embodiment the invention also provides a lighting unit 100 comprising a plurality of lighting unit cavities 130, as well as a plurality of light source units (not individually depicted), configured to generate light source unit light, wherein the light source units comprises light source and optionally collimator, wherein the light source units are configured to provide light source unit light in the lighting unit cavities 130.

Figure 3E:
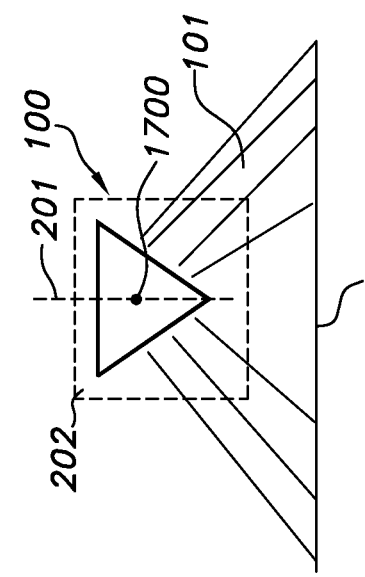

FIGS. 3a-3f schematically depict some aspects and variants of the lighting unit of the invention. In FIG. 3a, the cavity 130 further comprises a collimator 1200 or reflector to control the distribution of the light in a direction perpendicular to the cross section plane 202. This may be a simple V-shaped reflector, with reflective surfaces 151. Note that the lighting unit cavity 130 will in general be closed; but for the sake of understanding, an open structure is depicted.

FIG. 3b schematically depicts a lighting unit embodiment with an envelope with a plurality of facets, with facets 1120 of the light exit window 120, and reflective surfaces 151. Relative to a plane perpendicular to the first lighting unit axis and to a first lighting unit cross-sectional plane, the reflective surface(s) 151 may have an angle η, which may especially be ≤40°, such as ≤35°, like ≤30°.

The unit of FIG. 3a (etc.) can be repeated to form a series. Very schematically, the upper part of such lighting unit is shown in FIG. 3c, with the repeating structure of light source units encloses by V-shaped reflectors (having an opening width w2; having a length w1; and having a height H1). Referring to FIG. 3c, each light source unit 110 may comprise a single light source 1100, especially a LED light source with a large LED die; however, also each light source unit 110 may comprise a plurality of light sources. For instance, w1 may be in the range of 5-200 mm, such as 10-50 mm. For instance, w2 may be in the range of 5-50 mm, such as 10-25 mm. For instance, H1 may be in the range of 10-100 mm, such as 20-60 mm. L1 may for instance be in the range of 10-5000 mm, such as 50-2000 mm, like e.g. 100-1500 mm.

Figure 3D:
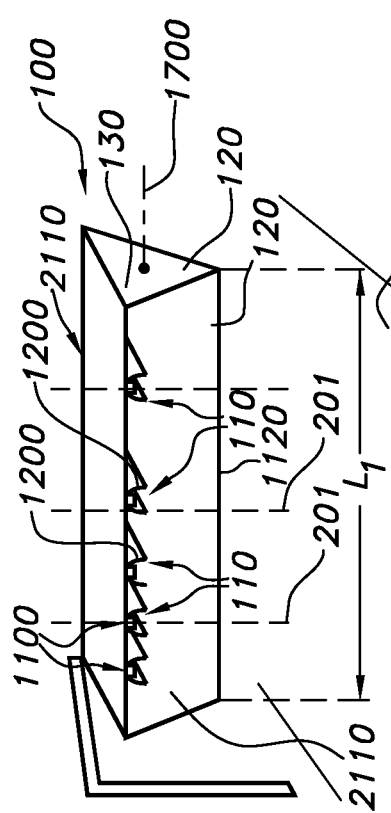
Figure 3F:
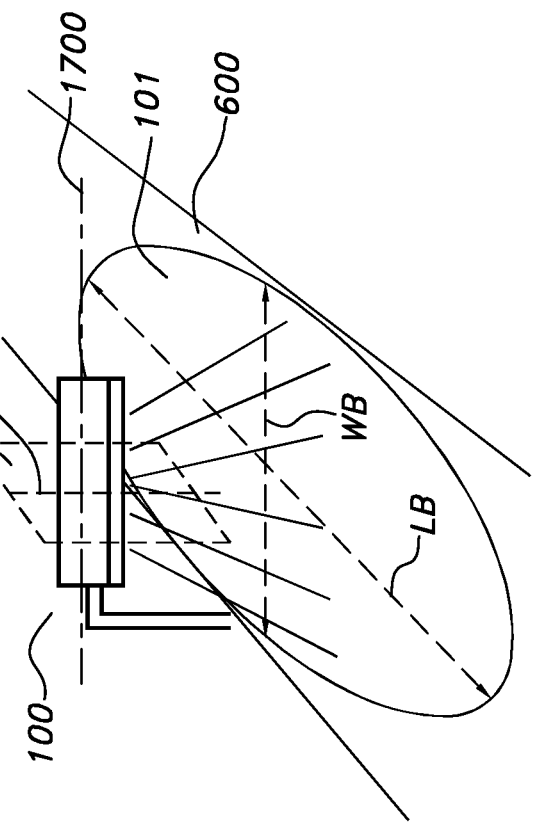

A lighting unit 100 in operation is shown in FIGS. 3d, 3e and 3f. FIG. 3d schematically depicts a lighting unit 100 comprising an array 2110 of light source units 110 (like FIG. 3c). FIG. 3d schematically shows such lighting unit 100 in application in side view. FIG. 3f shows that the length of the beam, indicated with reference LB, and the width of the beam, indicated with reference WB, may be controlled with the lighting unit. A large aspect ratio LB/WB, such as >10, or even >100 may be obtained, without spottiness of the light sources within the lighting unit 100.

Figure 3G:
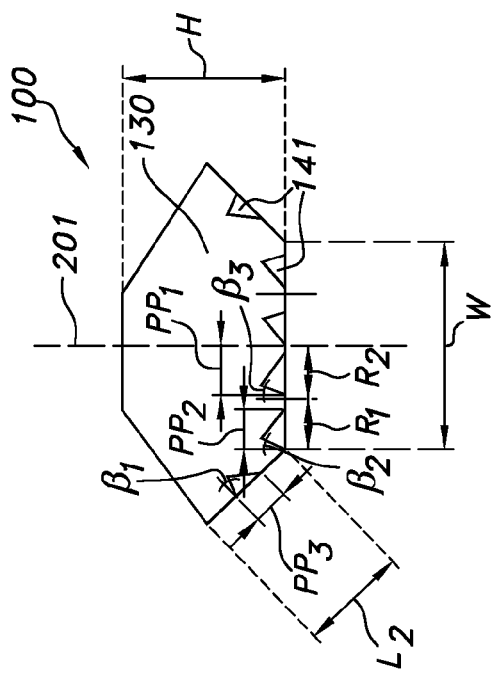

FIG. 3g is substantially the same as FIG. 3b, but now with some more details. Reference L2 is the length of one of the facets (part of the light exit window) and W is the length of another facet. L2+W+L2 is the length in the cross-sectional plane of the light exit window. L2 may e.g. be in the range of 10-50 mm and W may for instance be in the range of 10-5000 mm, such as 50-1500 mm. Reference β1 indicates an angle of a more steep prismatic facet with a normal to a facet of the light exit window. For instance, β1 at this facet of the light exit window may be in the range of 5°. Reference β2 and reference β3 also refer to angles of prismatic facets with normal to the light exit window. There may be a region R2 with smaller angles, β3, and a region R2 with larger angles (less steep). Hence, the steepness of the facets of the prismatic structures may vary over the (upstream face) of the light exit window. References PP1, PP2 and PP3 indicate the pitches. Especially R1≥R2, even more especially L2+R1>R2, even more especially L2+R1>2*R2. In the cross-sectional plane, over the entire length L2+W+L2, but at least over at least 30% of the length of the light exit window 120, prismatic structures may be arranged at the upstream face of the light exit window.

Figure 3H:
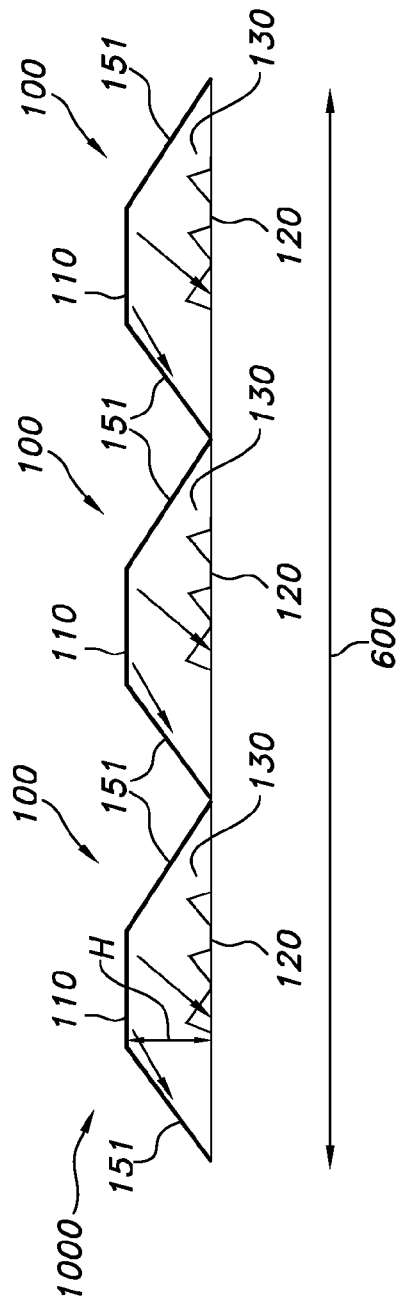

FIG. 3h schematically depicts an application of a plurality of lighting units 100 as a lighting unit arrangement 1000.

The invention claimed is:

1. A lighting unit comprising:
   a lighting unit cavity,
   a light source unit, configured to generate light source unit light, wherein the light source unit comprises a light source and a collimator, wherein the light source unit is configured to provide light source unit light in the lighting unit cavity, and
   a light exit window, configured to enclose at least part of the lighting unit cavity and configured to allow transmission of at least part of the light source unit light as a beam of light, wherein the light exit window comprises an upstream face and a downstream face, with the upstream face directed to the lighting unit cavity;
   wherein the lighting unit has a virtual first lighting unit axis in a virtual first lighting unit cross-sectional plane,
   wherein within the cross-sectional plane over a length at least 30% of the light exit window:
      the upstream face comprises light outcoupling structures, configured to couple the light source unit light via the light exit window out of the lighting unit, wherein the light outcoupling structures comprise prismatic light outcoupling structures,
      the light source unit is configured to illuminate a specific subset of the light extracting structures and to generate the light source unit light at a point at the light exit window with a spread in an angle of incidence (β)≤20° of the light source unit light at said point, and
   wherein the lighting unit is configured to generate the beam of light downstream of the light exit window having a beam angle (γ) in the range of 90-170° within the cross-sectional plane.

2. The lighting unit according to claim 1, wherein further within the cross-sectional plane over a length at least 30% of the light exit window (120):
   the light exit window is arranged under a slanting angle (α) in the range of 30-60° with the lighting unit axis.

3. The lighting unit according to claim 2, wherein within the cross-sectional plane over a length at least 30% of the light exit window:
   the light source unit is configured to generate the light source unit light at a point at the light exit window with a spread in an angle of incidence (β)≤10° of the light source unit light at said point.

4. The lighting unit according to claim 3, wherein the light exit window is V-shaped with two facets arranged under an angle (δ) in the range of 45-90°.

5. The lighting unit according to claim 3, wherein the light exit window has a curved shape.

6. The lighting unit according to claim 3, wherein the light exit window comprises a plurality of facets with one facet arranged perpendicular to the first lighting unit axis.

7. The lighting unit according to claim 3, wherein the light exit window is flat.

8. The lighting unit according to claim 7, wherein the cavity has a cavity height and a largest cavity width, wherein the ratio of cavity height to cavity width is larger than 0.4.

9. The lighting unit according to claim 8, wherein the collimator is configured to collimate the light source light in a direction perpendicular to the cross-sectional plane.

10. The lighting unit according to claim 9, wherein part of the cavity is enclosed by a reflector.

11. The lighting unit according to claim 10, wherein the upstream face further comprises a region with refractive light outcoupling structures, and wherein at least 50% of the upstream face comprises prismatic light outcoupling structures.

12. The lighting unit according to claim 11, comprising an array of light source units, and an elongated light exit window, configured to enclose at least part of the lighting unit cavity and configured to allow transmission of at least part of the light source unit light as the beam of light.

13. The lighting unit according to claim 12, further comprising a plurality of redirecting structures at the downstream face, wherein the redirecting structures are configured to control the spread of the beam of light in a direction perpendicular to the cross-sectional plane.

14. The lighting unit according to claim 13, wherein the light source unit comprises a solid state LED (light emitting diode) and wherein the lighting unit is configured to generate the beam of light downstream of the light exit window having a beam angle ($\gamma$) in the range of 90-140°.

15. Use of the lighting unit according to claim 14, for illumination of a road.

* * * * *